US010627161B2

(12) United States Patent
Alshamsi et al.

(10) Patent No.: US 10,627,161 B2
(45) Date of Patent: Apr. 21, 2020

(54) LABORATORY EQUIPMENT AND METHOD OF USING THE SAME FOR DRYING A STARTING MATERIAL TO PRODUCE NANO MATERIAL

(71) Applicant: King Abdulaziz City for Science and Technology, Riyadh (SA)

(72) Inventors: Mohammed Ahmad S. Alshamsi, Riyadh (SA); Sulaiman Mohammed Alfadul, Riyadh (SA)

(73) Assignee: KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 0 days.

(21) Appl. No.: 15/879,403

(22) Filed: Jan. 24, 2018

(65) Prior Publication Data

US 2019/0226762 A1    Jul. 25, 2019

(51) Int. Cl.

| F26B 9/06 | (2006.01) |
|---|---|
| F26B 21/14 | (2006.01) |
| F26B 21/08 | (2006.01) |
| F26B 21/12 | (2006.01) |
| F24F 7/08 | (2006.01) |
| F26B 25/08 | (2006.01) |
| F26B 21/10 | (2006.01) |
| B82Y 40/00 | (2011.01) |

(52) U.S. Cl.
CPC ................. *F26B 9/06* (2013.01); *F24F 7/08* (2013.01); *F26B 21/08* (2013.01); *F26B 21/10* (2013.01); *F26B 21/12* (2013.01); *F26B 21/14* (2013.01); *F26B 25/08* (2013.01); *B82Y 40/00* (2013.01)

(58) Field of Classification Search
CPC .. F26B 9/06; F26B 21/10; F26B 21/12; F26B 21/14; F26B 25/08; B82Y 40/00; F24F 7/08
USPC .......................................................... 34/491
See application file for complete search history.

(56) References Cited

U.S. PATENT DOCUMENTS

| 6,928,748 B2 * | 8/2005 | Chen ................. H01L 21/02063 257/E21.228 |
|---|---|---|
| 2002/0056206 A1 * | 5/2002 | Pace .................... A61K 31/405 34/372 |

(Continued)

FOREIGN PATENT DOCUMENTS

| CA | 2897875 C | * 12/2015 | .............. F26B 5/041 |
|---|---|---|---|
| KR | 20060112356 A | * 11/2006 | ............... B08B 3/04 |

(Continued)

*Primary Examiner* — Stephen M Gravini
(74) *Attorney, Agent, or Firm* — Steven M. Shape; Dennemeyer & Associates, LLC

(57) ABSTRACT

A laboratory equipment having an inlet and outlet tube for gas to enter and exit using specific shaped tubes with multi-outlet apertures in form of a network to allow the gas to enter the drying chamber to dry the material. The specific shaped tubes are in crescent shape and cross each other to have maximum surface area exposure to the drying chamber and effectively contact the material that is being dried. A gas inlet valve and outlet valve control the flow, pressure and temperature of the gas that is being used for drying the material to make nano material. A method of using the laboratory equipment with special gas inlet tubes is used for drying the material in form a slurry to make dry nano material.

10 Claims, 4 Drawing Sheets

(56) References Cited

U.S. PATENT DOCUMENTS

| | | | | |
|---|---|---|---|---|
| 2005/0091874 A1* | 5/2005 | Chen | ................. | H01L 21/02063 |
| | | | | 34/445 |
| 2006/0237033 A1* | 10/2006 | Yi | ............................ | B08B 3/04 |
| | | | | 134/2 |
| 2008/0276482 A1* | 11/2008 | Broughall | ................ | F26B 5/06 |
| | | | | 34/287 |
| 2009/0199425 A1* | 8/2009 | Taylor | ...................... | C01B 3/50 |
| | | | | 34/241 |
| 2014/0259721 A1* | 9/2014 | Durdag | .................... | F26B 5/16 |
| | | | | 34/95 |
| 2015/0338162 A1* | 11/2015 | Hoffman | ................ | F26B 5/041 |
| | | | | 34/429 |
| 2019/0168152 A1* | 6/2019 | Zhu | .................... | B01D 46/0068 |

FOREIGN PATENT DOCUMENTS

| | | | | |
|---|---|---|---|---|
| KR | 100696379 B1 * | 3/2007 | .............. | B08B 3/04 |
| WO | WO-2014113894 A1 * | 7/2014 | .............. | F26B 5/041 |
| WO | WO-2017152836 A1 * | 9/2017 | .............. | H01M 4/13 |

\* cited by examiner

LABORATORY EQUIPMENT AND METHOD OF USING THE SAME FOR DRYING A STARTING MATERIAL TO PRODUCE NANO MATERIAL

FIELD OF THE INVENTION

The present invention generally relates to a design of a laboratory equipment and method of using the same for drying a starting material that is in form of slurry under oxygen free condition to produce a nano and/or colloid particle in a controlled oxidation state.

BACKGROUND OF THE INVENTION

Preserving the properties in the drying process while producing the nano particle and/or colloidal particle is a challenging task. It is imperative that the surface area, size, shape, humidity, oxidation state etc., of the nanomaterial is maintained at the highest level after the processing.

As for the other nanomaterials, which have a high sensitivity (such as iron and other oxygen sensitive metals) for the surrounding environment, such as oxygen, temperature, etc., an improper processing may have changing effects on the properties such as surface, shape, complexity, assembly, size etc., and they may be transformed into other undesirable manufactured material. For example, a metal nanoparticle to be manufactured in a specific oxidization state such as zero valent iron nanoparticles Fe(0) if the drying conditions are not controlled, they turn into other forms such as $Fe_2O_3$, FeOOH or $Fe_3O_4$.

Another example that highlights the extent of the problem is during manufacturing process various nanomaterials are damaged as Nano-sol gel. In fact, they might be completely lost during the drying process.

Many industrial solutions have been used to solve this problem. However, some of which are complex, costly when operating, and do not meet the purpose of preserving the material in the desired oxidation state. Air-drying, span-drying and freezing-drying are not effective methods to dry the nanomaterials which have a high sensitivity of the surrounding environment. Indeed, changing the temperature during the drying process by raising the temperature (or reducing it) leads to changing the properties of the manufactured material, and not produced it as required. Moreover, air-drying is the least efficient method in drying, despite the low cost when operating, because it does not include the process of raising or reducing the temperature.

Therefore, there exists a need for an improved method and apparatus to generate nano material without the use of cumbersome process and involvement of a highly skilled technician.

SUMMARY

The invention discloses a laboratory equipment to dry a starting material to form a nano material in the desired oxidative state. More specifically the starting material is in a slurry form and is dried to produce/make a nano material and/or nano material in colloidal form.

In one embodiment, the laboratory equipment is scalable in size. The laboratory equipment has four main parts, the drying chamber to hold the material that is being processed, network of tubes that cross the drying chamber and have multi-outlet apertures to release the gas into the drying chamber, an inlet and outlet valves for gas to enter and exit the drying chamber and an input and output opening for putting the material in and taking it out.

In another embodiment, the drying chamber may have different shapes but optimized so the network of tubes are interspersed to reach maximum materials and/or optimize the reaching of gases to the materials in the slurry solution. In another embodiment, the drying chamber can be made of glass, ceramic or any other material that can accommodate liquid, slurry or solid material for drying to get the final product as nano material in the controlled oxidation-state. The drying chamber may be made up of glass material in one embodiment.

The gas can be inert in nature. The gas may also be oxygen free for deoxygenation of the staring material and the end product nano material. In another embodiment, the network of multi-outlet apertures, inside the glass chamber, is designed in a way that provides an inert gas distribution in all directions.

In one embodiment, the method of using the laboratory equipment, There are several ways to operate the laboratory equipment, one of which is as follow: Pumping inert gas (such as nitrogen or argon or other types of inert gases in combination, etc.) from the gas cylinder through non-interacting insulated tubes to feed the exhaust gas inlet, and pumping the inert gas into the branched network of tubes inside the drying chamber, and then the gas dispersing into the drying chamber through multi-outlet apertures and the inert gas permeates through the solution/slurry material, containing nanoparticles, in the form of bubbles rising to the top until the moist matter migrates from the matter to be dried. At this point, the multi-outlet apertures start to concentrate on pumping the inert gas on the wet matter (before it completely dries) containing a portion of humidity strongly associated with the solid material (nano). The air currents from the inert gas distributed in all directions increase the speed of drying, and decrease the opportunity for material reaction and interaction during the drying process. Moisture exists through exhaust gas outlet and the valve can control the amount of gas exiting the drying chamber. Before the process starts, the solution containing nanomaterials (slurry) is poured into the drying chamber through an upper nozzle. After drying, the dry powder is extracted from the same upper nozzle.

Additional features and advantages are realized through the techniques of the present invention. These embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

Several embodiments for a novel laboratory equipment are described. Although the present embodiments have been described with reference to specific example embodiments, it will be evident that various modifications and changes may be made to these embodiments without departing from the broader spirit and scope of the various embodiments.

Figure 1:
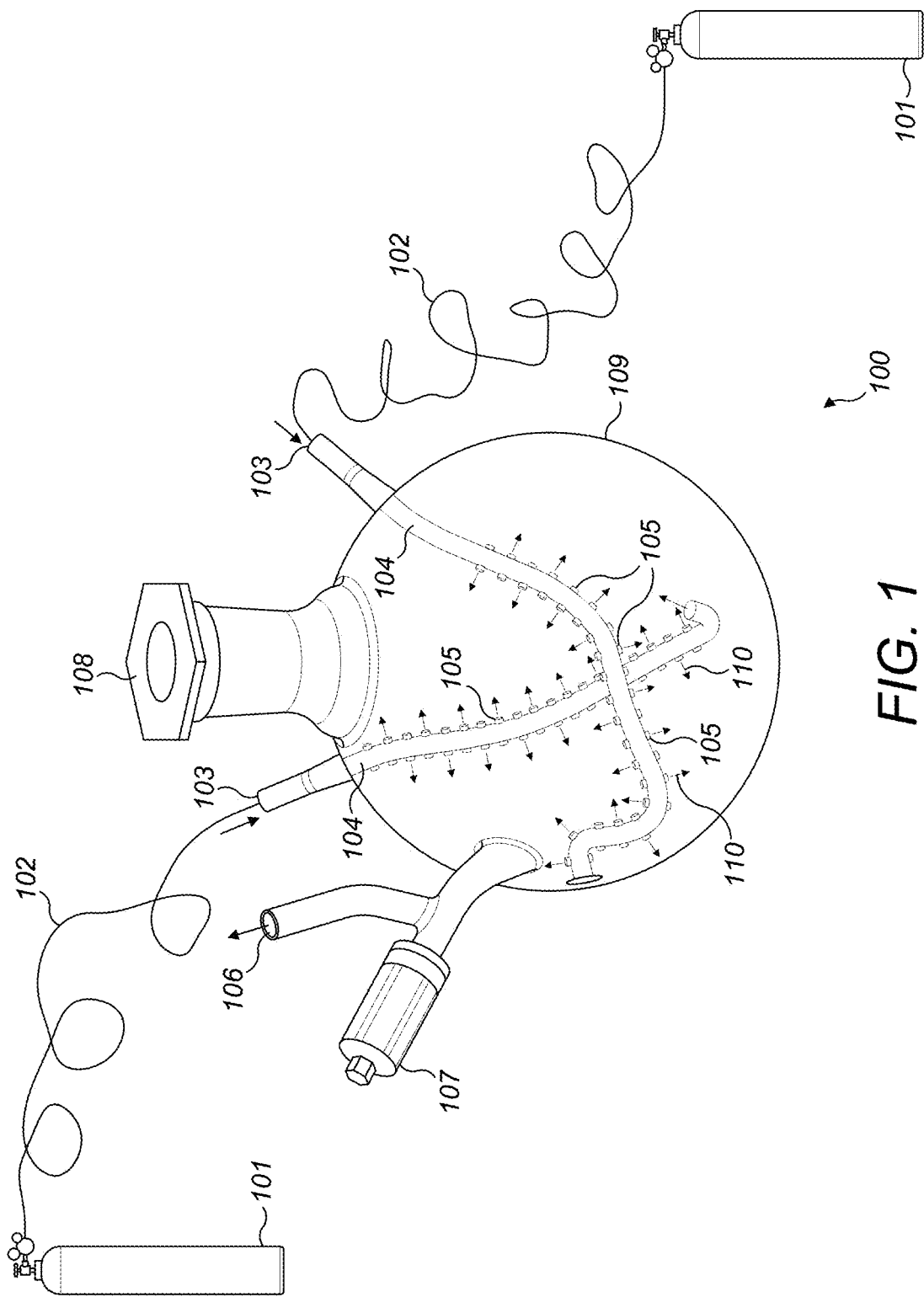
FIG. 1 shows the laboratory equipment with a drying chamber and network of tubes having multi-outlet apertures.

Referring to FIG. 1, laboratory equipment 100 is shown in detail. A drying chamber 109 contains gas inlets 103 to accommodate gas inflow into the drying chamber 109 to dry a starting material in any form such as slurry, liquid or other forms of starting materials. The drying chamber is made up of glass, ceramic or any other inert material that does not react with the starting material during process. The gas inflow connects several networks of tubes 105 inside the drying chamber 109. The tubes 105 are divided from the main tube 104 which is directly connected with the gas inlet 103. The inflow of tubes 105 form specific shapes such crescent or circles inside or any other useful shapes, the body of the drying chamber to reach and effective supply gas to the starting material and allow large surface area of the starting material to be contacted for drying. The apertures 110 may be of uniform shape and interspersed uniformly. The aperture 110 size may be modified and can be of different sizes on the same tube or different tubes. The gas is inert in nature so that non oxygen conditions can be maintained. In another embodiment, the gas may not be inert in nature. Release valve 106 enables the moisture and other by products produced during drying to be vented out. The starting material can be filled using aperture 108 and that can be plugged during operation.

Dried material in form of a nano material can be collected either using the aperture 108 or 106. Gas is released using a controller 107. Gas is supplied using gas cylinders 101. In the FIG. 1 only one form of the next work of multi-outlet apertures are shown. There may be any number that may be geometrically dispersed to create maximum exposure for the gases to reach the starting material during the process of drying. The multi-outlet apertures carrying network of tubes increase the efficiency and speed of drying, and decreases the opportunity of material interaction during the drying by a crescent-shape curvature glass tube with several inlets, in one embodiment. In addition, the efficiency of ventilation is increased due to the fact that the crescent shapes are intersecting at two degrees of height, one above the other, and the lower one is at the bottom wall of the drying chamber.

Figure 2:
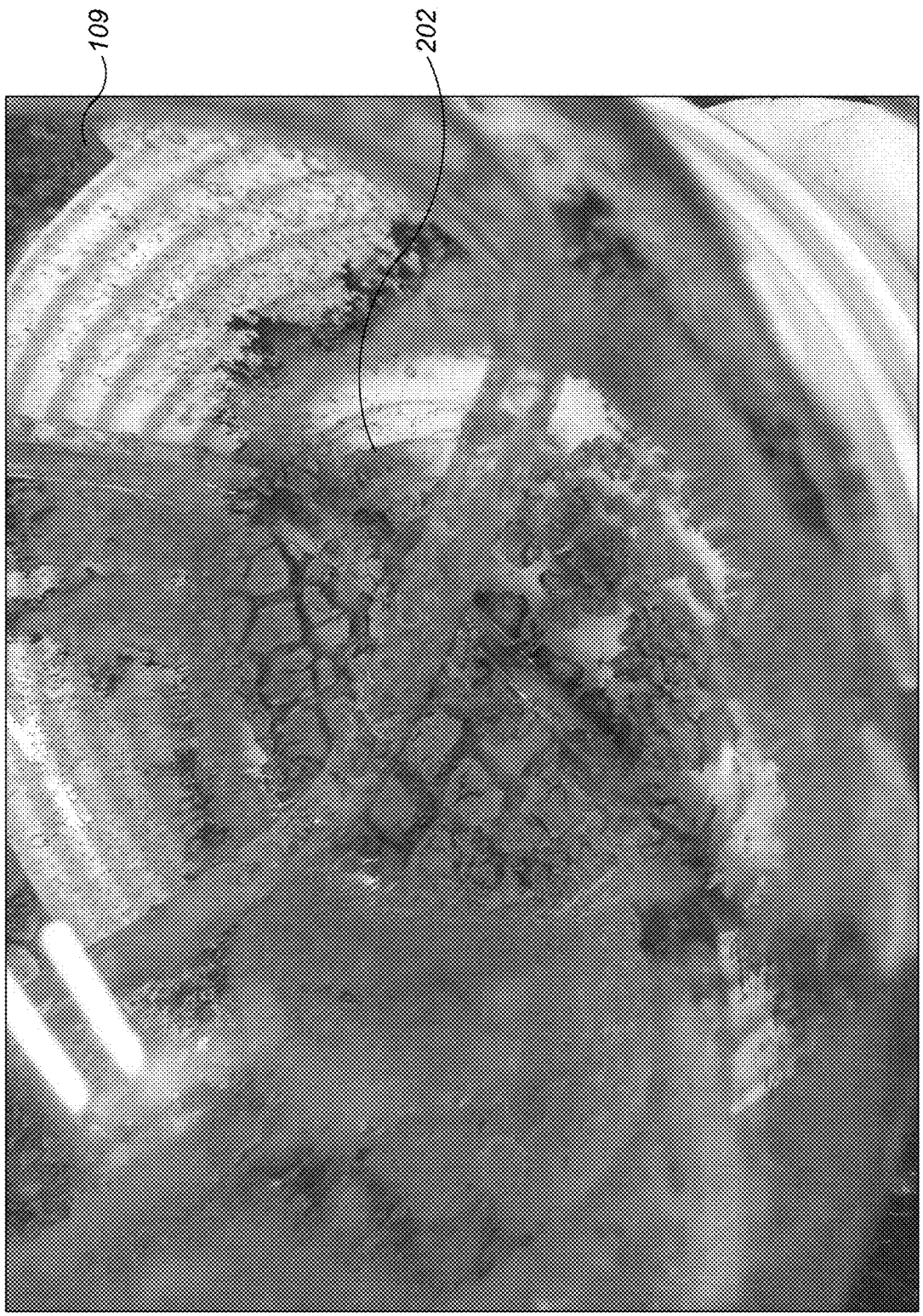
FIG. 2 shows the dried nano materials in the un-controlled (or undesired) oxidation state inside the drying chamber. In this case, inner-gas cylinders are not connected to the chamber
Figure 3:
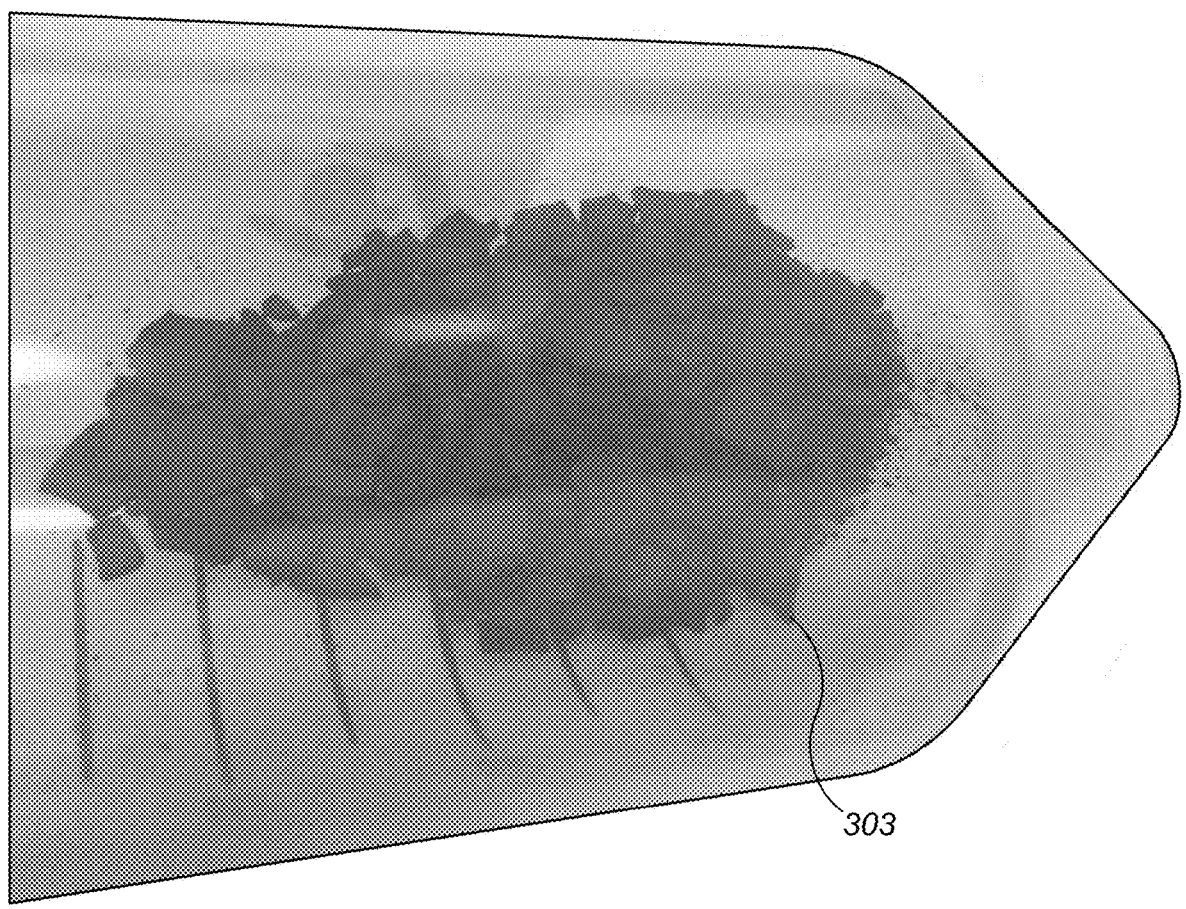
FIG. 3 shows the dried nano material in the controlled (or desired) oxidation state.

FIG. 2 shows how the starting material 202 is dispersed in the drying chamber 109 of the laboratory equipment. FIG. 3 shows final product the nano material 303 in the controlled oxidation-state as compared to FIG. 2 wherein it is not controlled and the final product obtained is undesirable. It is shown in FIG. 2 that the inner tubes were not connected to the gas cylinders hence their oxidative-state could not be controlled to produce desirable nano material as an end product. Using this lab equipment generates two types of nano-metal irons. The dried one in the brown or reddish color (FIG. 2) is without using the inner-gas cylinders, while in (FIG. 3) the black (gray) materials are produced under controlled condition with connecting the inner-gas cylinders into the chamber. For example, nano-iron can be produced in so many forms like Fe(0), Fe2O3, Fe3O4, FeOOH, etc. The rust form of iron usually in the form of Fe2O3 which contains a lot of oxygen in the formation of the nano-iron. It is easy detected by the brown-reddish color of the powder (iron rust).

Figure 4:
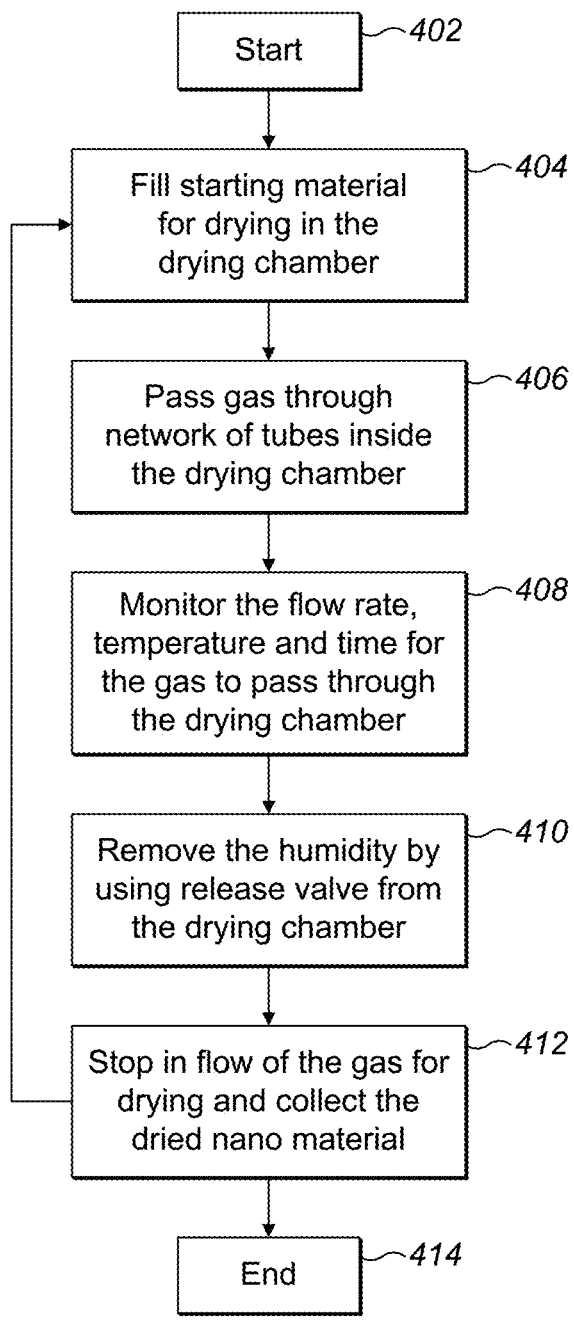
FIG. 4 shows the flow chart of the method of using the laboratory equipment.

There are several ways to operate the laboratory equipment described in (FIG. 4), one of which is as follows: The process may start 402 with filling the starting material for drying in the drying chamber 404. Pumping and passing inert gas 406 (such as nitrogen or argon, etc.) from the gas cylinder through non-interacting insulated tubes to feed the exhaust gas inlet, and pumping the inert gas into the branched glass tubes inside the drying chamber, and then exiting from multi-outlet apertures the inert gas permeates through the solution (starting material), containing nanoparticles, in the form of bubbles rising to the top until the moist matter migrates from the material to be dried. At this point, the ventilation holes start to concentrate on pumping the inert gas on the wet matter (before it completely dries) containing a portion of humidity strongly associated with the solid material (nano). The air currents from the inert gas distributed in all directions increase the speed of drying, and decrease the opportunity for material interaction during the drying process 408. Humidity exists or is removed 410 through exhaust gas outlet and the release valve can control the amount of gas exiting the vial. After drying, nano material as the dry powder 412 is extracted from the input aperture.

The laboratory equipment can be used in industrial settings or in laboratory setting by merely making the right size. Accordingly, the specification and drawings are to be regarded in an illustrative rather than a restrictive sense.

What is claimed is:

1. A laboratory equipment to make at least one of a nano material or a colloidal material in a controlled oxidation state, the laboratory equipment comprising:
    a drying chamber having a first wall at least partially defining a volume for receiving a starting material;
    a gas inlet extending through the first wall and in flow communication with a gas cylinder external to the drying chamber to receive an inert gas from the gas cylinder;
    a tube at least partially forming a network of tubes in the volume, the tube coupled to the gas inlet, the tube having a second wall defining a passage in flow communication with the gas inlet, the tube comprising a plurality of outlet apertures formed through the second wall and along a length of the tube proving flow communication between the passage and the volume to disperse the inert gas into the drying chamber;
    an aperture formed through the first wall to introduce the starting material into the volume; and
    an outlet valve to enable humidity in the drying chamber to be released when drying of the starting material is being carried out.

2. The laboratory equipment of claim 1, wherein the drying chamber comprises glass, ceramic or an inert material.

3. The laboratory equipment of claim 1, wherein the inert gas is at least one of nitrogen or argon.

4. The laboratory equipment of claim 1, wherein a different configuration for each tube in the network of tubes is formed in one of a crescent shape configuration or a circular configuration.

5. The laboratory equipment of claim 1, wherein the plurality of outlet apertures have a same size and a same cross-sectional shape.

6. A method of using a laboratory equipment to make a nano material in a controlled oxidation state, the method comprising:
introducing a starting material into a drying chamber of the laboratory equipment, the drying chamber having a first wall at least partially defining a volume for receiving the starting material;
passing an inert gas through a gas inlet extending through the first wall and in flow communication with a gas cylinder external to the drying chamber to receive the inert gas from the gas cylinder;
passing the inert gas through a tube coupled to the gas inlet at least partially forming a network of tubes in the volume, the tube having a second wall defining a passage in flow communication with the gas inlet, the tube comprising a plurality of outlet apertures formed through the second wall and along a length of the tube proving flow communication between the passage and the volume to disperse the inert gas into the drying chamber;
monitoring a flow rate, a temperature and a time for the inert gas to pass through the starting material inside the drying chamber;
removing humidity from within the drying chamber through a release valve in communication with the volume of the drying chamber;
stopping a flow of the inert gas; and
collecting the nano material formed by drying the starting material.

7. The method of using the laboratory equipment according to claim 6, wherein the drying chamber comprises glass, ceramic or an inert material.

8. The method of using the laboratory equipment according to claim 6, wherein the inert gas is at least one of nitrogen or argon.

9. The method of using the laboratory equipment according to claim 6, wherein a different configuration for each tube in the network of tubes is formed in one of a crescent shape configuration or a circular configuration.

10. The method of using the laboratory equipment according to claim 6, wherein the plurality of outlet apertures have a same size and a same cross-sectional shape.

* * * * *